UNITED STATES PATENT OFFICE.

JOHN G. BERGQUIST, OF CHICAGO, ILLINOIS, ASSIGNOR TO AMERICAN SINTERING COMPANY, A CORPORATION OF ILLINOIS.

SINTERING BLUE-BILLY.

No. 877,394.  Specification of Letters Patent.  Patented Jan. 21, 1908.

Application filed February 12, 1906. Serial No. 300,759.

*To all whom it may concern:*

Be it known that I, JOHN G. BERGQUIST, a citizen of the United States, residing at Chicago, in the county of Cook and State of Illinois, have invented a certain new and Improved Process for Sintering Blue-Billy, of which the following is a specification.

This invention relates to a new and improved process for sintering blue billy, and it has for its main object to provide a process whereby blue billy, which in itself is exceedingly refractory, can be sintered by the addition thereto, or admixture therewith, of material which will act as a flux and very substantially lower the fusing point of the blue billy, without at the same time depreciating the value of the product.

Another highly important object of the invention is to provide a process which enables blue billy to be sintered in a furnace lined with ordinary refractory or fire brick without rapidly destroying the refractory lining.

A subsidiary object of the invention is to provide a process by means of which blue billy and flue dust can be admixed and sintered together in such manner as to render available the iron in each, the flue dust ingredient serving on the one hand to flux the blue billy and the blue billy serving on the other hand to largely reduce or prevent adherence of the clinker to the furnace walls in which the material is reduced.

Blue billy, as is well understood, is that by-product resulting from the treatment of pyrites of iron in the making of acids, and notwithstanding the known fact that this by-product contains a very high percentage of iron which is comparatively low in impurities, notably in phosphorus, nevertheless owing to its high refractory nature, it has, so far as I am aware, been heretofore deemed impracticable to commercially utilize this by-product. That is to say, the high temperature to which blue billy must be raised, before it commences to fuse, causes it to combine chemically with the materials of which the refractory brick are formed, forming silicates, and thus rapidly eating away the furnace lining.

I have discovered that flue dust, such as is commonly derived from blast furnaces, when admixed with blue billy in proper proportions forms an admirable flux which lowers the fusing temperature of the blue billy to a stage where it can be readily fused sufficiently for sintering in a suitable furnace lined with ordinary refractory or fire brick.

The following comparative analyses of flue dust and blue billy show the approximate compositions of each; these analyses being each characteristic:

| | Flue dust. | Blue billy. |
|---|---|---|
| $SiO_2$ | 8.00 | } 3 to 4%. |
| $Al_2O_3$ | 2.00 | |
| CaO | 2.50 | } trace. |
| MgO | 1.00 | |
| Fe | 48.00 | 62 to 63%. |
| Coke dust | 16.00 | none. |
| Sulfur | .27 | 1.0 to 2.0%. |

From the foregoing it will be seen that the blue billy is composed almost entirely of oxid of iron, which in a pure state is practically infusible at all ordinary furnace temperatures, while on the other hand the flue dust contains considerable percentages of lime, silica and aluminium and a relatively large percentage of coke. It results that when a substantial proportion of flue dust is mixed with blue billy these fluxing and reducing ingredients of the flue dust lower the fusing point of the blue billy to a degree well within the reach of ordinary reducing furnaces.

In carrying out the process I prefer to use a rotary furnace of the general type used in making Portland cement, in which type of furnace the ore is fed continuously into an inclined cylindric furnace body which is slowly rotated so as to continuously tumble and continuously feed downwardly the stream of ore; gaseous or pulverized fuel being blown into the delivery end of the furnace and the products of combustion carried through the latter and delivered to a stack. Either before introducing, or during its progress through the furnace, the flue dust and pulverulent blue billy are thoroughly admixed, preferably in a dry state, and the proportions of the two ingredients are best determined by practical trial. Approximately fifty per cent. of each will ordinarily form a proper mixture; this mixture fusing at a moderate degree of temperature while at the same time it does not adhere, or clinker onto, the walls of the furnace seriously. On the other hand, the proportion of flue dust must be enough to lower the fusing temperature sufficiently to prevent the rapid eating away of the fire brick lining of the furnace.

It is common in sintering flue dust to add a fluxing ingredient for the purpose of lowering the fusing point, which in flue dust is comparatively high, and I have found that the same expedient may be advantageously employed in sintering the mixture of flue dust and blue billy. Pulverized fluor spar, ordinary salt and pulverized slag have each been found useful as fluxes for flue dust, and I find it desirable to add a small proportion of some such fluxing material to the mixture and for the same purpose, viz: to lower the fluxing temperature. The use of any such fluxing ingredient, particularly the use of pulverized slag, very materially increases the tendency of the agglomerate to adhere to the walls of the furnace, but in carrying out the present invention, the action of the blue billy in forming silicates largely neutralizes this tendency, as hereinbefore pointed out, with the result that more fluxing material may be added with impunity than in the case of sintering flue dust only. I have found that ten per cent. of the weight of the blue billy, of a suitable flux such as fluor spar, salt or pulverized slag is ample. While flue dust forms with blue billy the most advantageous mixture for effecting the clinkering or agglomerating, because of the reducing action due to the presence of the coke therein, yet other fine ore containing or having admixed therewith slag-forming materials, may be substituted for the flue dust.

I claim as my invention:

1. An improved process of converting pulverulent blue billy and pulverulent flue dust into sintered nodules which consists in intimately mixing said ingredients in their loose disintegrated condition in proportions to effect the lowering of the fluxing temperature of the mixture to a point below ordinary furnace temperature and then agglomerating the mixture into lumps by tumbling the loose material progressively and gradually through a moving furnace and in the presence of a fusing heat.

2. An improved process of converting blue billy into sintered lumps suitable for blast furnace reduction, which consists in mixing therewith comminuted iron ore and comminuted slag-forming material, in proportions to effect the lowering of the fluxing temperature of the mass to a point below that at which fire brick fuses, and effecting the agglomeration of the mixture by tumbling the material progressively and gradually through a suitable receptacle in the presence of a fusing heat.

JOHN G. BERGQUIST.

Witnesses:
 EMILIE ROSE,
 FRANK L. BELKNAP.